(12) United States Patent
Subedi et al.

(10) Patent No.: US 8,992,667 B2
(45) Date of Patent: Mar. 31, 2015

(54) SYSTEMS AND METHODS FOR CLOSED CRANKCASE VENTILATION AND AIR FILTRATION

(71) Applicant: Cummins Filtration IP, Inc., Columbus, IN (US)

(72) Inventors: Yashpal Subedi, Madison, WI (US); Brian W. Schwandt, Fort Atkinson, WI (US); Scott W. Schwartz, Cottage Grove, WI (US)

(73) Assignee: Cummins Filtration IP, Inc., Columbus, IN (US)

( * ) Notice: Subject to any disclaimer, the term of this patent is extended or adjusted under 35 U.S.C. 154(b) by 0 days.

(21) Appl. No.: 13/961,268

(22) Filed: Aug. 7, 2013

(65) Prior Publication Data

US 2014/0048052 A1 Feb. 20, 2014

Related U.S. Application Data

(60) Provisional application No. 61/683,855, filed on Aug. 16, 2012.

(51) Int. Cl.
*F02B 77/00* (2006.01)
*F02M 25/06* (2006.01)
*F01M 13/04* (2006.01)

(52) U.S. Cl.
CPC .............. *F02M 25/06* (2013.01); *F01M 13/04* (2013.01); *Y02T 10/121* (2013.01); *Y10S 55/19* (2013.01)
USPC .................. 95/23; 95/273; 95/287; 55/385.3; 55/419; 55/482; 55/DIG. 19; 96/422

(58) Field of Classification Search
USPC ............ 55/385.3, 290, DIG. 34, 309; 95/272; 96/396, 422; 60/297; 123/41.86, 572, 123/574, 573, 198 E
See application file for complete search history.

(56) References Cited

U.S. PATENT DOCUMENTS

| 4,557,226 A | 12/1985 | Mayer et al. |
| 5,499,616 A | 3/1996 | Enright |

(Continued)

FOREIGN PATENT DOCUMENTS

| CA | 2 374 765 | 12/2000 |
| CA | 2 410 644 | 11/2001 |

(Continued)

OTHER PUBLICATIONS

International Search Report and Written Opinion for PCT/US2013/055130 dated Jan. 16, 2014.

*Primary Examiner* — Duane Smith
*Assistant Examiner* — Minh-Chau Pham
(74) *Attorney, Agent, or Firm* — Foley & Lardner LLP

(57) ABSTRACT

A system for providing air to an internal combustion engine comprises a crankcase ventilation unit that receives unrefined blowby gas from a crankcase, separates oil from the unrefined blowby gas, and discharges refined blowby gas. A conduit delivers the refined blowby gas to an air cleaner housing. The air cleaner housing comprises a first chamber that receives intake air through a first port, a second chamber that receives intake air from the first chamber and refined blowby gas from the conduit through a second port, and a third chamber that receives a mixture of intake air and refined blowby gas from the second chamber and discharges the mixture through a third port. A primary filter element filters the intake air as it passes from the first chamber to the second chamber. A secondary filter element filters the mixture as it passes from the second chamber to the third chamber.

17 Claims, 4 Drawing Sheets

(56) References Cited

U.S. PATENT DOCUMENTS

| | | |
|---|---|---|
| 6,161,529 A | 12/2000 | Burgess |
| 6,261,333 B1 | 7/2001 | Dickson |
| 6,527,821 B2 | 3/2003 | Liu et al. |
| 6,557,536 B2 | 5/2003 | Burgess |
| 6,561,171 B2 | 5/2003 | Burgess |
| 6,907,869 B2 | 6/2005 | Burgess et al. |
| 7,185,489 B2 * | 3/2007 | Kolstad et al. ............ 60/297 |
| 7,311,748 B2 | 12/2007 | Holmes et al. |
| 7,614,390 B2 | 11/2009 | Holzmann et al. |
| 7,699,029 B2 * | 4/2010 | Herman et al. ............ 123/41.86 |
| 7,849,841 B2 | 12/2010 | Holzmann et al. |
| 7,870,850 B2 | 1/2011 | Herman et al. |
| 8,146,545 B2 | 4/2012 | Frazier, Jr. et al. |
| 8,146,574 B2 | 4/2012 | Heckel et al. |
| 8,342,160 B2 * | 1/2013 | Heckel et al. ............ 123/572 |
| 8,616,188 B2 * | 12/2013 | Heckel et al. ............ 123/572 |
| 8,764,866 B2 * | 7/2014 | Mitsuda et al. ............ 55/385.3 |
| 2003/0150436 A1 * | 8/2003 | Stegmaier et al. ............ 123/572 |
| 2007/0144120 A1 * | 6/2007 | Kawasaki et al. ............ 55/385.3 |
| 2008/0229720 A1 * | 9/2008 | Benscoter et al. ............ 55/290 |
| 2009/0025662 A1 * | 1/2009 | Herman et al. ............ 123/41.86 |
| 2010/0199958 A1 | 8/2010 | Heckel et al. |
| 2010/0313830 A1 | 12/2010 | Ruppel et al. |
| 2011/0056383 A1 * | 3/2011 | Make et al. ............ 96/396 |
| 2011/0180051 A1 | 7/2011 | Schwandt et al. |
| 2011/0180052 A1 | 7/2011 | Schwandt et al. |
| 2013/0056407 A1 | 3/2013 | Parikh et al. |
| 2014/0033922 A1 * | 2/2014 | Peck et al. ............ 95/272 |

FOREIGN PATENT DOCUMENTS

| | | |
|---|---|---|
| DE | 601 26 270 | 11/2007 |
| DE | 600 35 343 | 2/2008 |
| EP | 1 067 293 | 1/2001 |
| GB | 2 452 980 | 3/2009 |
| GB | 2 457 598 | 8/2009 |
| WO | 00/77352 | 12/2000 |
| WO | 01/03800 | 1/2001 |
| WO | 01/90540 | 11/2001 |
| WO | 02/068802 | 9/2002 |
| WO | 2004/067925 | 8/2004 |
| WO | 2005/092475 | 10/2005 |
| WO | 2009/037496 | 3/2009 |
| WO | 2011/070341 | 6/2011 |
| WO | WO-2011/070341 | 6/2011 |
| WO | 2011/095790 | 8/2011 |

* cited by examiner

US 8,992,667 B2

SYSTEMS AND METHODS FOR CLOSED CRANKCASE VENTILATION AND AIR FILTRATION

CROSS-REFERENCE TO RELATED APPLICATION

This application claims the benefit of and priority to U.S. Provisional Application No. 61/683,855, filed Aug. 16, 2012, which is hereby incorporated by reference in its entirety.

FIELD

The present disclosure relates to closed crankcase ventilation systems and air filtration systems for use with internal combustion engines.

BACKGROUND

U.S. Pat. No. 8,146,574, which is hereby incorporated by reference in its entirety, discloses an engine air management system for an internal combustion engine generating blowby gas in a crankcase containing engine oil and oil aerosol. The system includes combinations of two or more of an air-oil separator, an air filter, and an acoustic silencer.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

The present disclosure is related to a system for providing combustion air to an internal combustion engine. The system comprises a crankcase ventilation unit that receives unrefined blowby gas from a crankcase of the internal combustion engine, that separates oil from the unrefined blowby gas with an air-oil separator, and that discharges refined blowby gas. An air cleaner housing has a flowpath therethrough from upstream to downstream. A conduit connects the crankcase ventilation unit to the an cleaner housing so as to deliver the refined blowby gas to the air cleaner housing, thereby forming a closed crankcase ventilation system. The air cleaner housing comprises a first chamber that receives intake air through a first port, a second chamber downstream of the first chamber that receives intake air from the first chamber and that receives refined blowby gas from the conduit through a second port, and a third chamber downstream of the second chamber that receives a mixture of intake air and refined blowby gas from the second chamber and that discharges the mixture through a third port. The air cleaner housing further comprises a primary filter element that filters the intake air as it passes from the first chamber to the second chamber and a secondary filter element that filters the mixture as it passes from the second chamber to the third chamber.

Also disclosed is an air cleaner for providing combustion air to a forced induction device located upstream of an internal combustion engine. The air cleaner comprises a housing defining a flowpath therethrough from upstream to downstream. A first chamber defined, by the housing receives intake air through a first port and a second chamber defined by the housing receives intake air from the first chamber and refined crankcase blowby gas through a second port. A third chamber downstream of the second chamber receives a mixture of the intake air and the refined crankcase blowby gas from the second chamber and discharges the mixture through a third port to the forced induction device. A primary filter element filters the intake air as it passes from the first chamber to the second chamber and a secondary filter element filters the mixture as it passes from the second chamber to the third chamber.

A method for providing combustion air to an internal combustion engine is also disclosed. The method comprises separating oil from unrefined crankcase blowby gas to create refined crankcase blowby gas, passing intake air through a primary filter element, mixing the intake air with the refined crankcase blowby gas to create a mixture of gas, and passing the mixture of gas through a secondary filter element. The method further comprises pressurizing the mixture of gas with a forced induction device and providing the pressurized mixture of gas to the internal combustion engine. The refined crankcase blowby gas is mixed with the intake air downstream of the primary filter element. The secondary filter element is upstream of the forced induction device.

BRIEF DESCRIPTION OF THE DRAWINGS

Examples of systems and methods for closed crankcase ventilation and air filtration are described with reference to the following figures. The same numbers are used throughout the figures to reference like features and like components.

DETAILED DESCRIPTION

Figure 1:
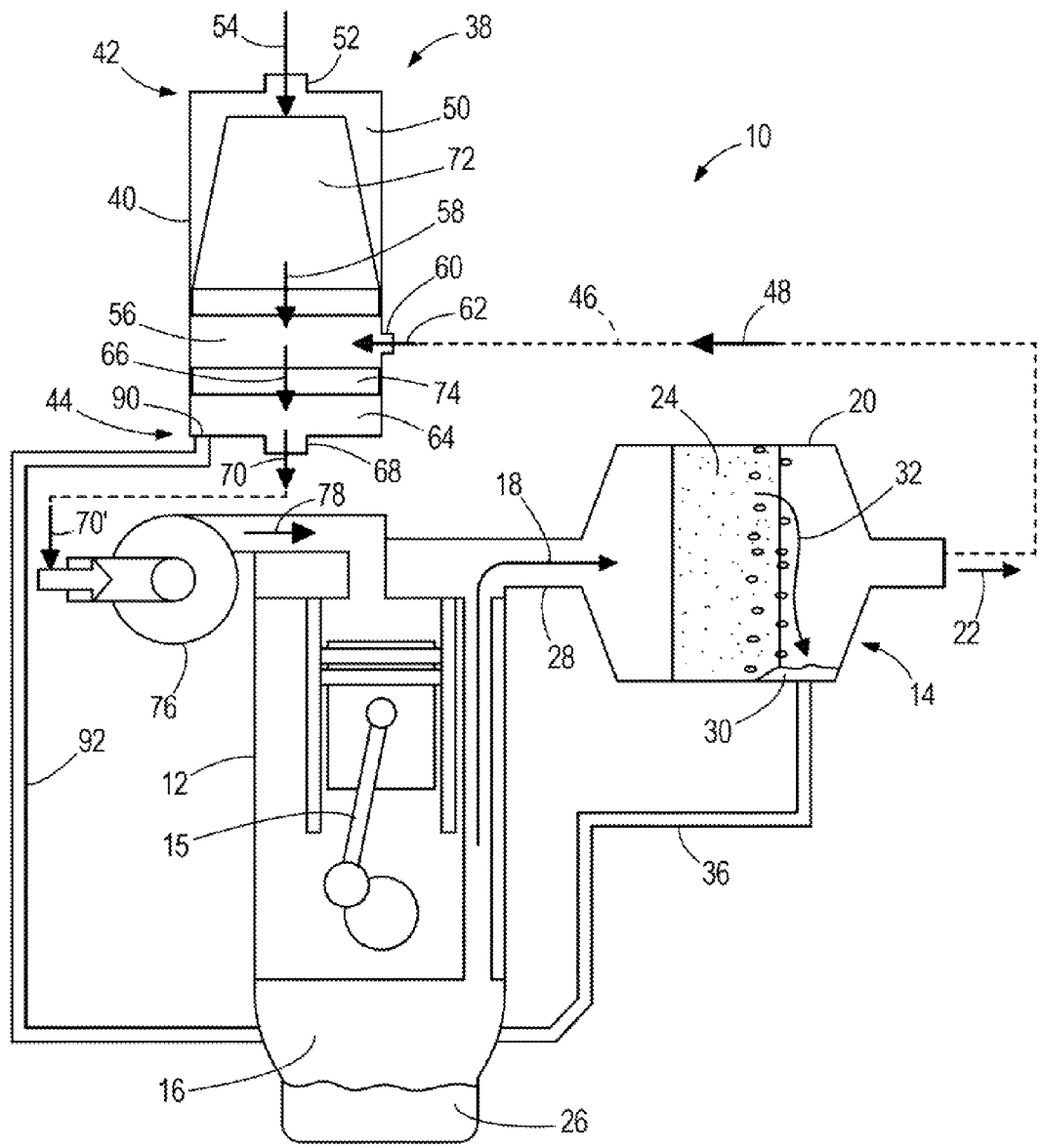
FIG. 1 illustrates one embodiment of a closed crankcase ventilation system.

FIG. 1 illustrates one embodiment of a system 10 for providing combustion air to an internal combustion engine 12. The system comprises a crankcase ventilation unit 14 that receives unrefined blowby gas from a crankcase 16 of the internal combustion engine 12. The flow of unrefined blowby gas from the crankcase 16 to the crankcase ventilation unit 14 is shown by the arrow 18. The crankcase ventilation unit 14 separates oil from the unrefined blowby gas with an air-oil separator 20 and discharges refined blowby gas, as shown by the arrow 22.

In the embodiment shown, the air-oil separator 20 includes a coalescer 24. The internal combustion engine 12 generates blowby gas in the crankcase 16, which contains engine oil 26 and oil aerosol. The air-oil separator 20 receives blowby gas, as shown by arrow 18, through inlet 28. The blowby gas is unrefined when it enters at the inlet 28 of the air-oil separator 20. The unrefined blowby gas is then passed through the coalescer 24, which in the embodiment shown comprises a coalescing filter media element that causes oil in the unrefined blowby gas to coalesce within/on the filter media and to drain to a lower portion 30 of the air-oil separator 20, as shown by the arrow 32. After passing through the coalescer 24, the blowby gas is refined. The refined blowby gas then exits through the outlet 34 of the air-oil separator 20, as shown by the arrow 22. Oil that has collected in the lower portion 30 of the air-oil separator 20 drains back to the crankcase 16 via drain line 36.

Though the air-oil separator 20 is shown herein as comprising a coalescer 24, it should be understood that many other types of air-oil separators could be provided, such as those shown and described in U.S. Pat. Nos. 7,614,390; 7,699,029; 7,849,841; and 7,870,850, each of which is incorporated by reference herein in its entirety. For example, the air-oil separator 20 may comprise an impactor separator or a centrifugal separator.

The system 10 further comprises an air cleaner 38 having a housing 40 having a flow path therethrough from upstream as shown at arrow 42 to downstream as shown at arrow 44. A conduit 46 connects the crankcase ventilation unit 14 to the air cleaner housing 40 so as to deliver the refined blowby gas to the air cleaner housing 40, as shown by arrow 48, thereby forming a closed crankcase ventilation system, as will be described further herein below.

The air cleaner housing 40 comprises a first chamber 50 that receives intake air through a first port 52 as shown by the arrow 54. The intake air can be provided through an intake tube (not shown herein) that conveys air from the atmosphere surrounding the system 10 to the air cleaner housing 40. The air cleaner housing 40 further comprises a second chamber 56 downstream of the first chamber 50 that receives intake air from the first chamber, as shown by arrow 58 and that receives refined blowby gas from the conduit 46 through a second port 60, as shown by the arrow 62. The air cleaner housing 40 further comprises a third chamber 64 downstream of the second chamber 56 that receives a mixture of intake air and refined blowby gas from the second chamber 56, as shown by the arrow 66 and that discharges the mixture through a third port 68, as shown by the arrow 70.

The air cleaner housing 40 further comprises a primary filter element 72 that filters the intake air as it passes from the first chamber 50 to the second chamber 56. The primary filter element 72 may comprise a standard cold air intake filter. The air cleaner housing 40 further comprises a secondary filter element 74 that filters the mixture as it passes from the second chamber 56 to the third chamber 64. The secondary filter element 74 may comprise a standard air filter, an oleophobic medium, a coalescing filter, a rotating coalescing filter, or foam, as will be described further herein below.

In the embodiment shown in FIG. 1, the system 10 further comprises a forced induction device 76 downstream of the air cleaner 38 that receives the mixture of intake air and refined blowby gas discharged from the air cleaner housing 40. The forced induction device 76 pressurizes the mixture before it reaches the internal combustion engine 12. The forced induction device 76 receives the mixture of intake air that was discharged from the air cleaner housing 40, as shown by arrow 70, and discharges pressurized air, as shown by arrow 78, to the internal combustion engine 12. In one example, the forced induction device 76 can be a supercharger mechanically driven by a belt, gear, shaft, or chain connected to a crankshaft 15 of the engine 12 (connection not shown). In another embodiment, the forced induction device 76 can be a turbocharger powered by an exhaust-gas driven turbine. In either embodiment, the forced induction device 76 comprises an air compressor with blades that increase the pressure, temperature, and density of the mixture of intake air and refined blowby gas before delivering the mixture to the internal combustion engine 12.

The system 10 is considered a "closed crankcase ventilation system" because blowby gas is not vented directly to the atmosphere at any point. The primary filter element 72 prevents the refined blowby gas delivered to the air cleaner housing 40 from the crankcase ventilation unit 14 (via conduit 46 and second port 60) from venting to the atmosphere unless it is filtered by the primary filter element 72 first. Additionally, connection of the third chamber 64 to the forced induction device 76 via the third port 68 assures that the mixture of intake air and refined blowby gas is not vented to the atmosphere, but rather returned to the internal combustion engine 12 via the forced induction device 76.

Despite the use of crankcase emission filtration methods, for example the use of an air-oil separator 20, there is evidence that some oil aerosol in the refined blowby gas still makes it to the clean air intake ducting before the forced induction device 76, causing the forced induction device's compressor blades to be coated with oil. This reduces the isentropic efficiency of the forced induction device 76, thereby reducing the overall efficiency of the internal combustion engine 12 and decreasing fuel efficiency. The location of the secondary filter element 74 as being downstream of the second inlet 62 provides a benefit in that the refined blowby gas is further filtered by the secondary filter element 74 prior to being delivered to the forced induction device 76. In one embodiment, the secondary filter element 74 further separates oil from the refined blowby gas to help maintain clean compressor blades within the forced induction device 76.

Further, the presence of the secondary filter element 74 prevents or minimizes the chances that debris or ice will reach the compressor blades of the forced induction device 76. If the forced induction device's compressor blades are contacted by debris or ice, they may be damaged. Therefore, the presence and location of the secondary filter element 74 provides additional protection to the compressor blades of the forced induction device 76 from debris, ice, and oil aerosol, which may damage or negatively affect the efficiency of the forced induction device 76. In one embodiment, the secondary filter element 74 filters ice chips that form from mixing relatively colder intake air, shown entering the air cleaner housing 40 at arrow 54, with relatively hotter refined blowby gas, shown entering the air cleaner housing 40 at arrow 62, from reaching the forced induction device 76.

Now with reference to FIG. 2, an embodiment in which the secondary filter element 74' comprises a coalescing filter will be described. Cold intake air enters the air cleaner housing 40 via the first port 52, as shown by arrow 54. Air flows through the primary filter element 72 as shown by arrows 80 and is then passed to the second chamber 56, as shown by arrows 58. The intake air is then mixed with refined blowby gas that enters the second chamber 56 via the second port 60 as shown by the arrow 62. The mixture of intake air and refined blowby gas then passes into the third chamber 64 as shown by the arrows 66. From here, the mixture of gas flows in an inward-out (inside-out) manner as shown by the arrows 82 through the secondary filter element 74', here comprising a coalescing filter. In one embodiment, the air cleaner housing 40 comprises a cylindrical housing having an annular gap 84 between the secondary filter element 74' and an inner surface 86 of the air cleaner housing 40. After the mixture flows in the inward-out (inside-out) direction as shown by the arrows 82, it circulates within the annular gap 84 and exits via the third port 68 as shown by the arrow 70. Oil contained in the mixture coalesces within/on the secondary filter element 74', here comprising a coalescing filter, and drains to a lower portion 91 of the air cleaner housing 40. In this embodiment, a drain port 90 is provided in the air cleaner housing 40 to allow oil that is separated from the refined crankcase blowby gas to exit the air cleaner housing 40. Such oil could be returned to the crankcase 16 by drainage of oil through the drain port 90 via a drain line 92 (see FIG. 1).

Figure 3:
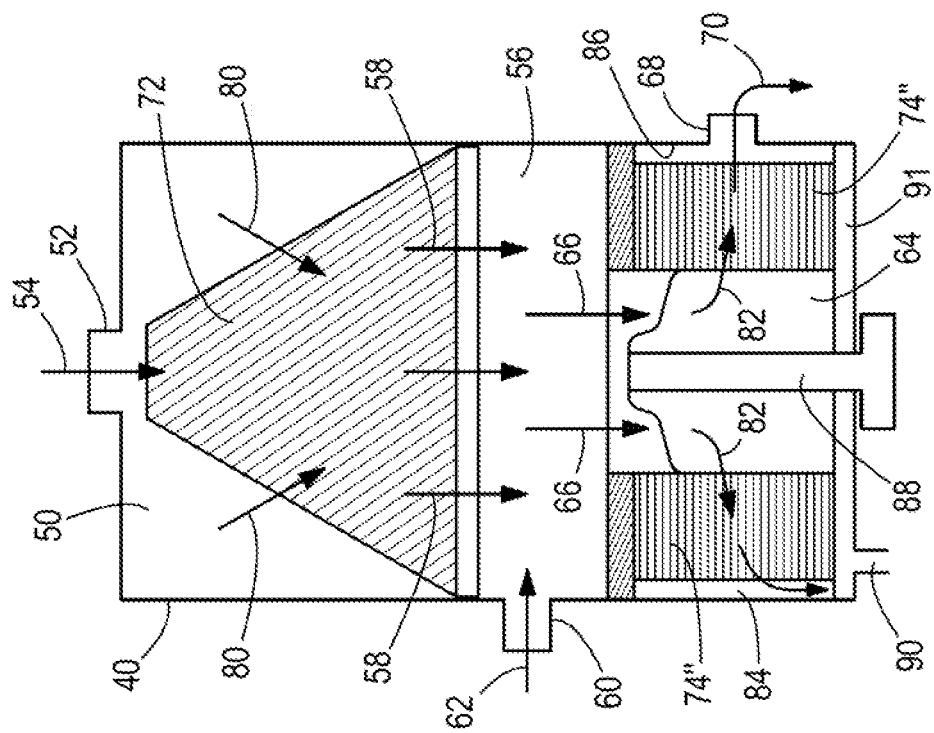
FIG. 3 illustrates another embodiment of an air cleaner housing for use in closed crankcase ventilation systems such as, for example, those disclosed herein.

Turning to FIG. 3, in another embodiment the secondary filter element 74″ comprises a rotating coalescing filter. In the embodiment shown, the rotating, coalescing filter is coupled to a shaft 88 extending axially into the air cleaner housing 40. The shaft 88 is driven to rotate, for example by connection to a drive pulley of the internal combustion engine 12, or by a fluid motor. Such a rotating coalescing filter is for example further described in U.S. patent application Ser. No. 12/969,755 (U.S. Patent Publication No. US 2011/0180052), the disclosure of which is hereby incorporated by reference in its entirety, and will therefore not be described more fully herein.

Figure 2:
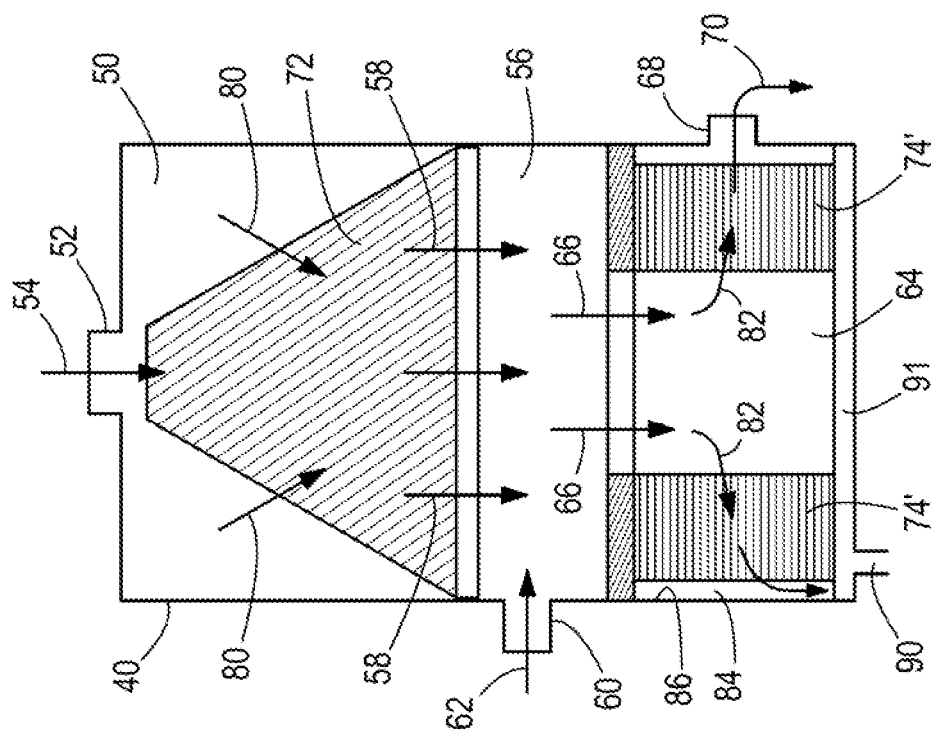
FIG. 2 illustrates one embodiment of an air cleaner housing for use in closed crankcase ventilation systems such as, for example, those disclosed herein.

As with FIG. 2, in FIG. 3 cold intake air enters first port 52 as shown by arrow 54, flows through primary filter element 72 as shown by arrows 80, flows into second chamber 56 as shown by arrows 58, and is mixed with refined blowby gas entering via second port 60 as shown by arrow 62. The mixture of intake air and refined blowby gas then flows into third chamber 64, as shown by arrows 66. Here, the mixture of intake air and refined blowby gas is pumped by the centrifugal force of the rotating coalescing filter in an inward-out (inside-out) direction as shown by the arrows 82. The mixture then exits the rotating coalescing filter and circulates through the annular gap 84 until it eventually exits the air cleaner housing 40 through third port 68 as shown by the arrow 70. Oil that has coalesced within/on the secondary filter element 74″ here comprising a rotating coalescing filter, drains to the lower portion 91 of the air cleaner housing 40 and exits via drain port 90, to be returned via drain line 92 to the crankcase 16 (see FIG. 1).

As described herein above, the secondary filter element 74, 74′, 74″ can take many forms, depending on the result or application desired. The secondary filter element 74 can comprise a standard air filter (FIG. 1), and in one embodiment could comprise the same material as the primary filter element 72. In another embodiment, the secondary filter element 74 comprises foam. In such an embodiment, the secondary filter element 74 may filter debris and/or ice chunks from the mixed intake air and refined blowby gas prior to the mixture being delivered to the forced induction device 76. In such an embodiment, the secondary filter element 74 may need to be accessible from the exterior of the air cleaner housing 40 such that it can be replaced when it is coated with enough oil that its efficiency has decreased. In another embodiment, the secondary filter element 74 comprises an oleophobic medium that is resistant to plugging from oil in the blowby gas.

In another embodiment, the secondary filter element 74 can comprise a coalescing filter that further separates oil from the refined crankcase blowby gas (FIG. 2). If the secondary filter element comprises a coalescing filter, the secondary filter element may need to be accessible for servicing as the useful life of the coalescing filter decreases. The secondary filter element 74′ may filter debris and/or ice chunks from the mixed intake air and refined blowby gas prior to the mixture being delivered to the forced induction device 76.

In another embodiment, the secondary filter element 74″ can comprise a rotating coalescing filter (FIG. 3). The rotating coalescing filter may not need to be accessible from the exterior of the air cleaner housing 40 for servicing, because oil is shed from the rotating coalescing filter due to centrifugal force and the useful life of the rotating coalescing filter can thereby be extended. The secondary filter element 74″ may filter debris and/or ice chunks from the mixed intake air and refined blowby gas prior to the mixture being delivered to the forced induction device 76.

Now with reference to FIG. 4, a second embodiment of a system 10′ for providing combustion air to an internal combustion engine 12 will be described. As with FIG. 1, blowby gas is discharged from the internal combustion engine 12 to the crankcase ventilation unit 14, as shown by arrow 18. The crankcase ventilation unit 14 separates oil from the unrefined blowby gas with an air-oil separator 20 as described further hereinabove, and discharges refined blowby gas, as shown by arrow 22. The refined blowby gas is provided to air cleaner housing 40 through a second port 60, as shown by arrow 62. Meanwhile, intake air enters air cleaner housing 40 through first port 52, as shown by arrow 54. After passing through primary filter element 72, the intake air enters second chamber 56, where it is mixed with the refined blowby gas. This mixture of intake air and refined blowby gas is then passed through secondary filter element 74 to third chamber 64, from where it is then discharged through third port 68 to a forced induction device 76, as shown by arrow 70.

Figure 4:
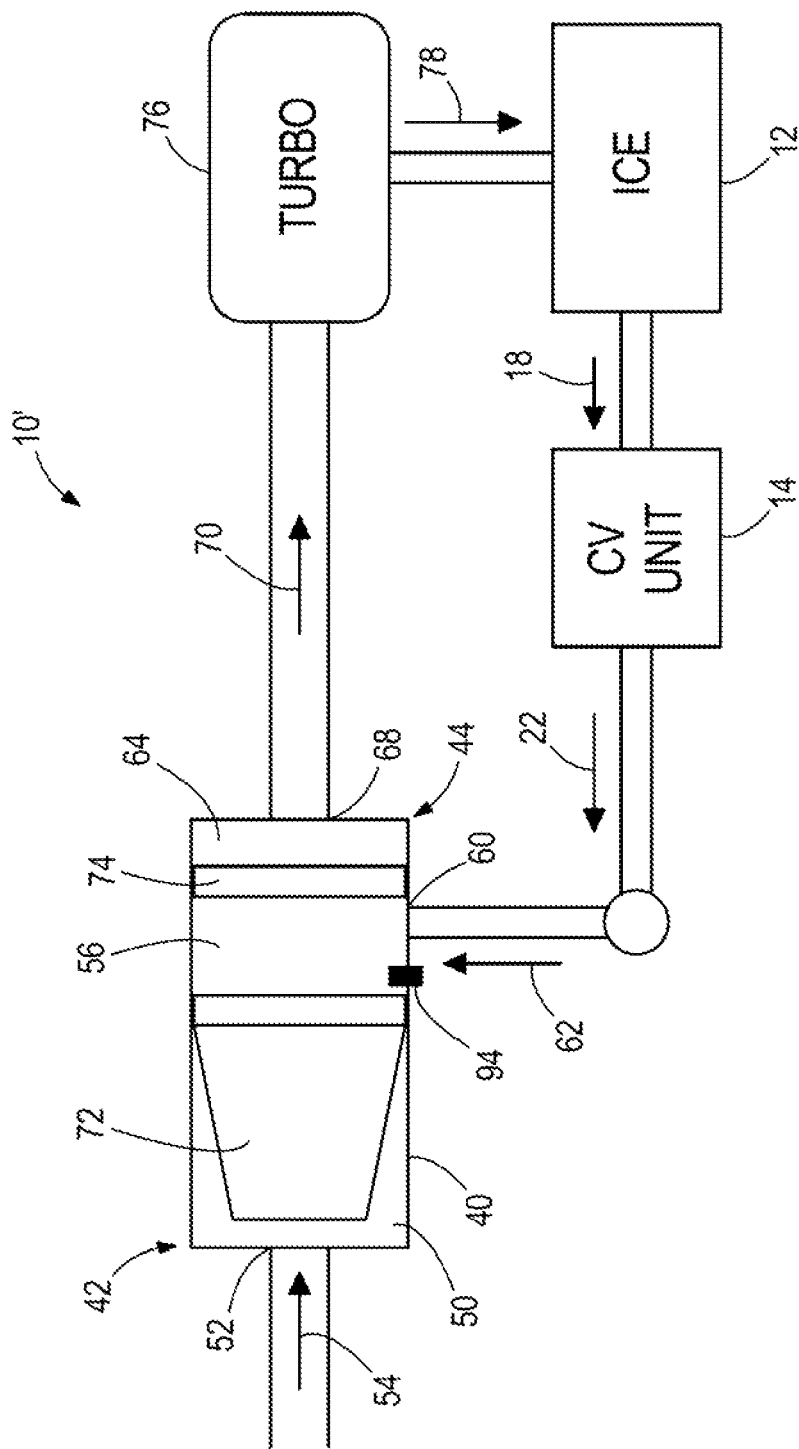
FIG. 4 schematically illustrates another embodiment of a closed crankcase ventilation system.

In the embodiment of FIG. 4, a mass air flow sensor 94 is provided within the system 10′. The mass air flow sensor 94 senses the mass flow rate of air entering the internal combustion engine 12. A flowpath through the air cleaner housing 40 is defined from upstream at arrow 42 to downstream at arrow 44. The mass air flow sensor 94 is located downstream of the first port 52 and upstream of the second port 60. The mass air flow sensor 94 is further located downstream of the primary filter element 72. Placement of the mass air flow sensor 94 upstream of second port 60 ensures that the mass air flow sensor 94 is not affected by recirculation of the refined blowby gas entering at second port 60, such as by oil aerosol contained in the blowby gas. Placement of the mass air flow sensor 94 downstream of the primary filter element 72 ensures that the mass air flow sensor 94 is not damaged by debris that might be present in the unfiltered intake air.

With reference to each of FIGS. 1-4 above, an air cleaner 38 for providing combustion air to a forced induction device 76 located upstream of an internal combustion engine 12 will be described. The air cleaner 38 comprises a housing 40 defining a flow path therethrough from upstream (as shown at arrow 42) to downstream (as shown at arrow 44). The air cleaner 38 further comprises a first chamber 50 defined by the housing 40 that receives intake air through a first port 52 and a second chamber 56 defined by the housing 40 that receives intake air from the first chamber 50 and refined crankcase blowby gas through a second port 60. The refined crankcase blowby gas is delivered to the second port 60 from a crankcase ventilation unit 14 that receives unrefined crankcase blowby gas from a crankcase 16 of the internal combustion engine 12, separates oil from the unrefined crankcase blowby gas with an air-oil separator 20, and discharges the refined crankcase blowby gas. The air cleaner 38 further comprises a third chamber 64 downstream of the second chamber 56 that receives the mixture of the intake air and refined crankcase blowby gas from the second chamber 56, and discharges the mixture through a third port 68 to the forced induction device 76.

The air cleaner 38 further comprises a primary filter element 72 that filters the intake air as is passes from the first chamber 50 to the second chamber 56 and a secondary filter element 74, 74′, 74″ that filters the mixture as it passes from the second chamber 56 to the third chamber 64. In one embodiment, the secondary filter element 74 comprises foam. In one embodiment, the secondary filter element 74 comprises an oleophobic medium. In some embodiments, the secondary filter element 74′, 74″ further separates oil from the refined crankcase blowby gas. In one embodiment, the secondary filter element 74′ comprises a coalescing filter (FIG.

2). In another embodiment, the secondary filter element comprises a rotating coalescing filter (FIG. 3). Each embodiment of the secondary filter element 74, 74', 74" prevents debris from reaching the forced induction device 76. Each embodiment of the secondary filter element 74, 74', 74" also prevents ice formed from relatively colder intake air mixing with relatively hotter refined crankcase blowby gas from reaching the forced induction device 76.

The air cleaner 38 may further comprise a mass air flow sensor 94 in the housing 40 downstream of the first port 52 and upstream of the second port 60. In one embodiment, the mass air flow sensor 94 is located downstream of the primary filter element 72.

Figure 5:
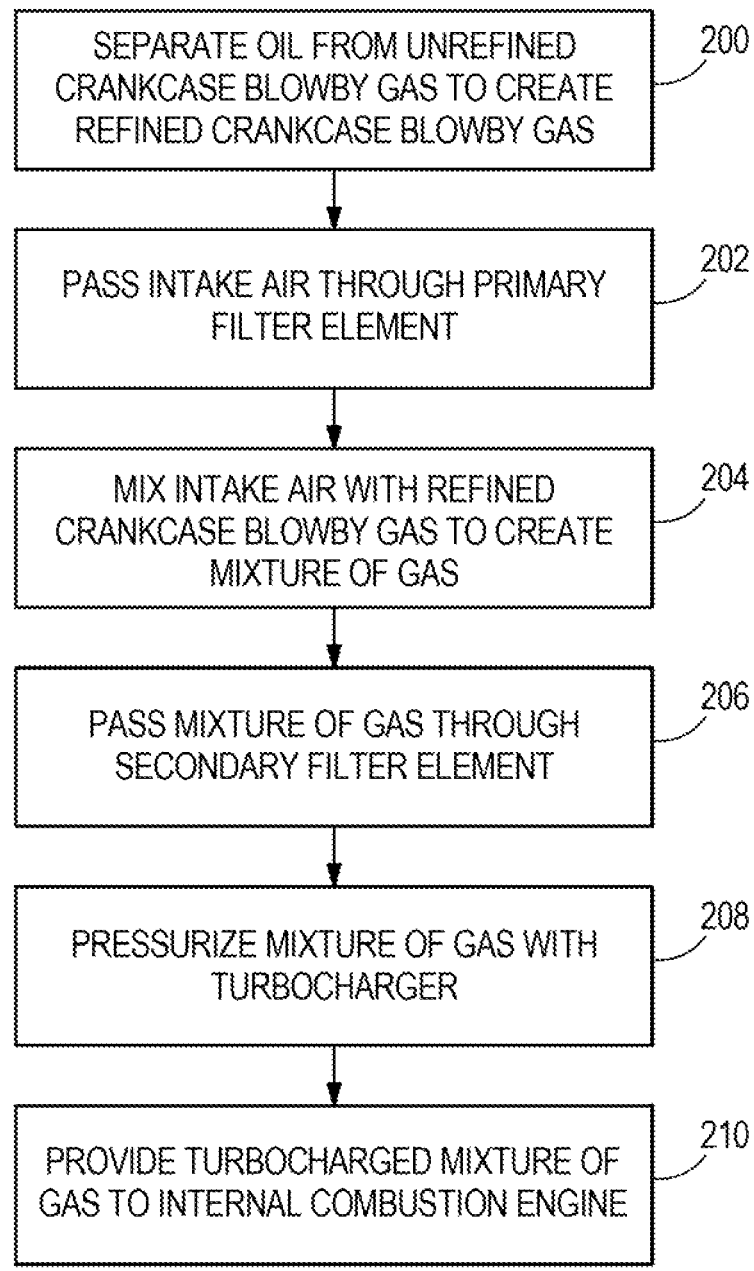
FIG. 5 illustrates one example of a method for providing combustion air to an internal combustion engine according to the present disclosure.

Now with reference to FIG. 5, one embodiment of a method for providing combustion air to an internal combustion engine 12 will be described. The method comprises separating oil from unrefined crankcase blowby gas to create refined crankcase blowby gas, as shown at box 200. The method further comprises passing intake air through a primary filter element 72, as shown at box 202. The method further comprises mixing the intake air with the refined crankcase blowby gas to create a mixture of gas, as shown at box 204. In one embodiment of the method, the refined crankcase blowby gas is mixed with the intake air downstream of the primary filter element 72 and the secondary filter element 74 is upstream of a forced induction device 76. The method farther comprises passing the mixture of gas through a secondary filter element 74, 74', 74", as shown at box 206. The method further comprises pressurizing the mixture of gas with the forced induction device 76, as shown at box 208. The method further comprises providing the pressurized mixture of gas to the internal combustion engine 12, as shown at box 210.

According to one embodiment of the method, the intake air and the refined crankcase blowby gas are mixed within an air cleaner housing 40, so as to form a closed crankcase ventilation system. The secondary filter element 74, 74', 74" prevents debris from reaching the forced induction device 76. The secondary filter element further prevents ice formed from relatively colder intake air mixing with relatively hotter refined crankcase blowby gas from reaching the forced induction device 76.

The method may further comprise sensing air flow in the air cleaner housing 40 downstream of the primary filter element 72 and upstream of the secondary filter element 74, 74', 74". The method may further comprise sensing air flow upstream of a port 60 in the air cleaner housing 40 where the refined crankcase blowby gas enters the air cleaner housing 40. The method may further comprise further separating oil from the refined crankcase blowby gas with the secondary filter element 74, 74', 74".

The disclosure hereinabove allows the return port (second port 60) for the crankcase ventilation blowby gas to be moved forward in the air intake system 10, 10' between the primary filter element 72 and the secondary filter element 74, 74, 74" of the air cleaner 38, thus achieving further filtration via the secondary filter element 74, 74', 74". The secondary filter element 74, 74, 74" provides additional filtration of the crankcase blowby gases, thereby reducing the amount of oil aerosol that reaches the forced induction device 76, and thereby reducing, the poisoning of the compressor blades in the forced induction device 76. An option enabled by the present disclosure is to place the return port for the refined blowby gases (second port 60) between the primary and secondary filter elements 72, 74, 74', 74". The return port for the refined blowby gases (second port 60) is inserted in the space between the primary and secondary filter elements 72, 74, 74', 74". This allows the secondary filter element 74, 74', 74" to act as a final filtration to crankcase ventilation emissions, thereby reducing the amount of oil aerosol flowing into the clean air intake system and thereby increasing fuel efficiency.

In the above description, certain terms have been used for brevity, clarity, and understanding. No unnecessary limitations are to be inferred, therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims. Each limitation in the appended claims is intended to invoke interpretation under 35 U.S.C. §112(f), only if the terms "means for" or "step for" are explicitly recited in the respective limitation. While each of the method claims includes a specific series of steps for accomplishing certain functions, the scope of this disclosure is not intended to be bound by the literal order or literal content of steps described herein, and non-substantial differences or changes still fall within the scope of the disclosure.

What is claimed is:

1. An air cleaner for providing combustion air to a forced induction device located upstream of an internal combustion engine, the air cleaner comprising:
   a housing defining a flowpath therethrough from upstream to downstream;
   a first chamber defined by the housing that receives intake air through a first port;
   a second chamber defined by the housing that receives intake air from the first chamber and receives refined crankcase blowby gas from a crankcase ventilation unit through a second port, wherein the crankcase ventilation unit separates oil from an unrefined blowby gas with an air-oil separator;
   a third chamber downstream of the second chamber that receives a mixture of the intake air and the refined crankcase blowby gas from the second chamber and discharges the mixture through a third port to the forced induction device;
   a primary filter element that filters the intake air as it passes from the first chamber to the second chamber; and
   a secondary filter element that filters the mixture as it passes from the second chamber to the third chamber.

2. The air cleaner of claim 1, wherein the secondary filter element further separates oil from the refined crankcase blowby gas.

3. The air cleaner of claim 2, wherein the secondary filter element comprises a coalescing filter.

4. The air cleaner of claim 3, wherein the secondary filter element comprises a rotating coalescing filter.

5. The air cleaner of claim 1, wherein the secondary filter element comprises foam.

6. The air cleaner of claim 1, wherein the secondary filter element comprises an oleophobic medium.

7. The air cleaner of claim 1, wherein the secondary filter element prevents debris from reaching the forced induction device.

8. The air cleaner of claim 7, wherein the secondary filter element prevents ice formed from relatively colder intake air mixing with relatively hotter refined crankcase blowby gas from reaching the forced induction device.

9. The air cleaner of claim 1, further comprising a mass air flow sensor in the housing downstream of the first port and upstream of the second port.

10. The air cleaner of claim 9, wherein the mass air flow sensor is downstream of the primary filter element.

11. A method for providing combustion air to an internal combustion engine, the method comprising:
- separating oil from unrefined crankcase blowby gas to create refined crankcase blowby gas upstream of a primary filter element;
- passing intake air through the primary filter element;
- mixing the intake air with the refined crankcase blowby gas after passing the intake air through the primary filter element to create a mixture of gas;
- passing the mixture of gas through a secondary filter element;
- pressurizing the mixture of gas with a forced induction device; and
- providing the pressurized mixture of gas to the internal combustion engine;
- wherein the refined crankcase blowby gas is mixed with the intake air downstream of the primary filter element; and
- wherein the secondary filter element is upstream of the forced induction device.

12. The method of claim 11, wherein the intake air and the refined crankcase blowby gas are mixed within an air cleaner housing, so as to form a closed crankcase ventilation system.

13. The method of claim 12, wherein the secondary filter element prevents debris from reaching the forced induction device.

14. The method of claim 13, wherein the secondary filter element prevents ice formed from relatively colder intake air mixing with relatively hotter refined crankcase blowby gas from reaching the forced induction device.

15. The method of claim 12, further comprising sensing air flow in the air cleaner housing, downstream of the primary filter element and upstream of the secondary filter element.

16. The method of claim 12, further comprising sensing air flow upstream of a port in the air cleaner housing where the refined crankcase blowby gas enters the air cleaner housing.

17. The method of claim 11, further comprising further separating oil from the refined crankcase blowby gas with the secondary filter element.

* * * * *